March 17, 1959 E. W. VERES 2,877,903
FILTER UNIT
Filed Nov. 29, 1956 2 Sheets-Sheet 1
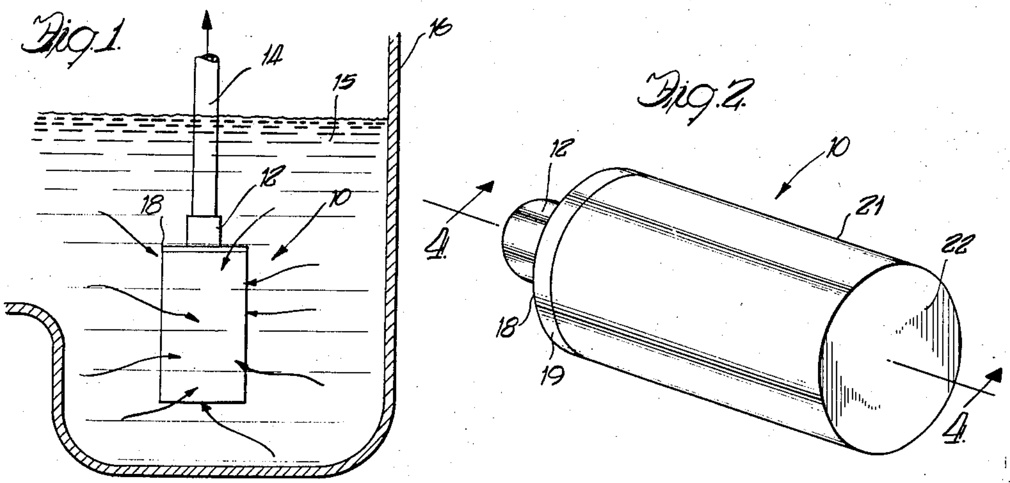
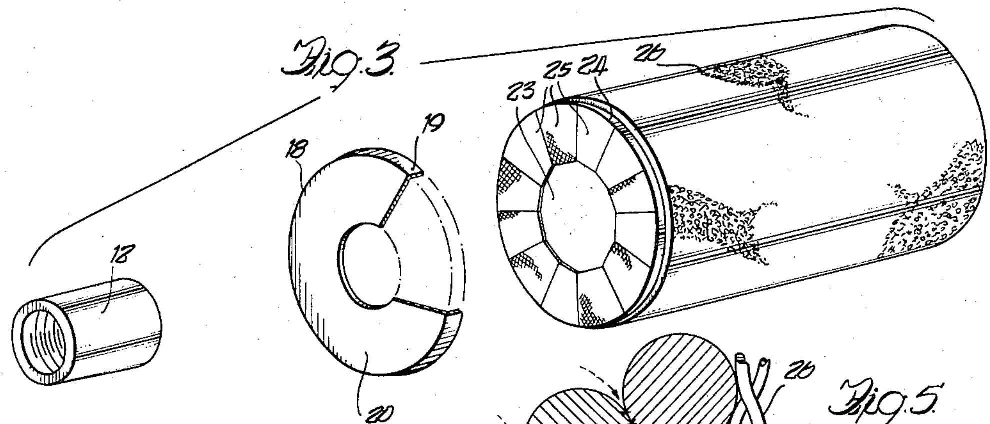
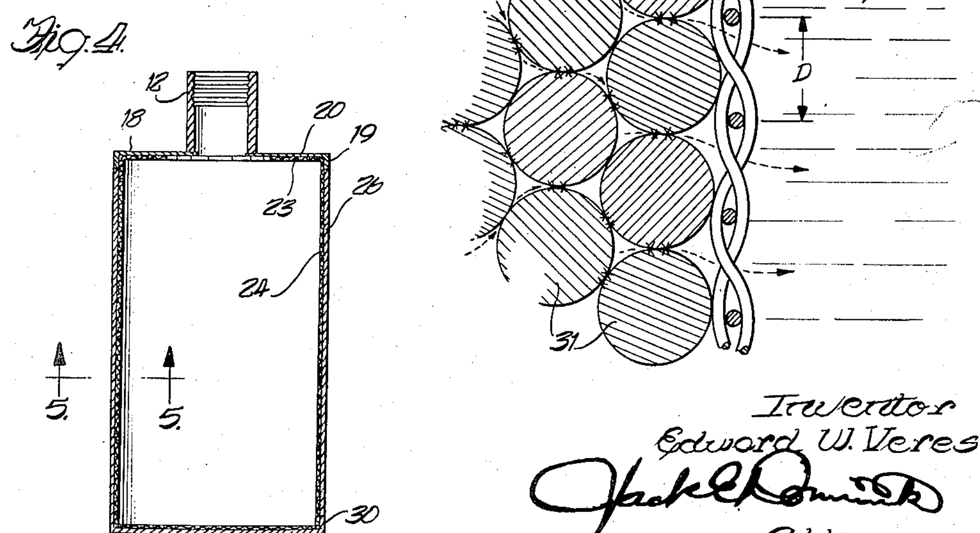
Inventor
Edward W. Veres
Jack E. Dominik
Attorney FILTER UNIT
Filed Nov. 29, 1956
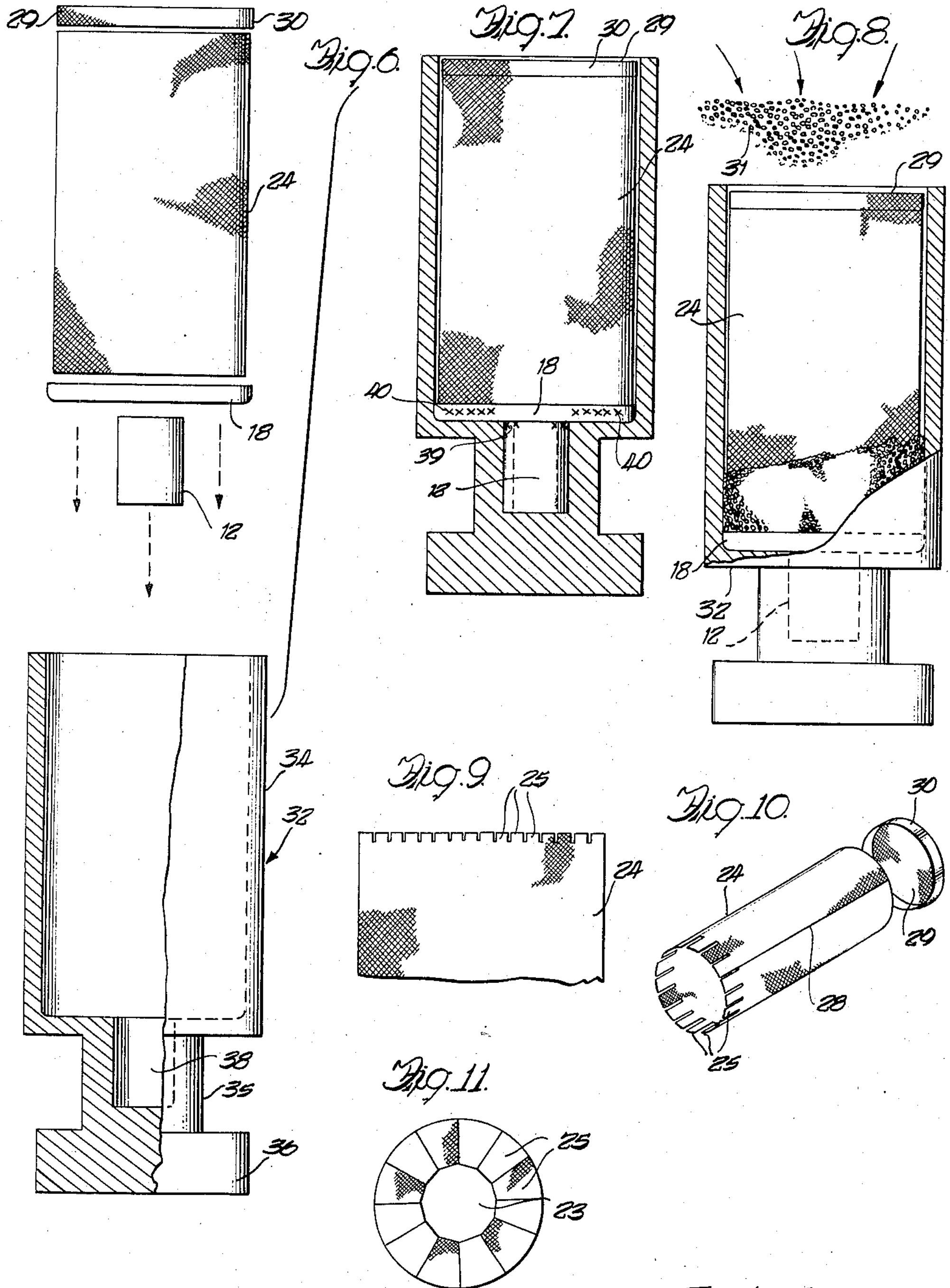
Inventor
Edward W. Veres
Jack E. Dominik
Attorney United States Patent Office 2,877,903

Patented Mar. 17, 1959

2,877,903

FILTER UNIT

Edward W. Veres, Arlington Heights, Ill., assignor to Arrow Tools, Inc., Chicago, Ill.

Application November 29, 1956, Serial No. 625,135

8 Claims. (Cl. 210—462)

The present invention relates to a filter unit. More specifically, the invention contemplates a sintered metal filter which finds particular, although not necessarily exclusive utility as a sump filter.

The filter field is quite well developed and several known standards exist for evaluating filters. The most important test, however, is the one of cost. Cost is normally evaluated in terms of cost for capacity. Capacity, in turn, is normally rated in terms of gallonage per minute. Another factor to be determined is the pressure drop in the filter for a given capacity.

With the foregoing in mind, it is the principal object of the present invention to produce a filter which costs less than a commercially available unit of the same capacity, and at the same time insures equal or superior filtering characteristics at a lower power consumption due to a decreased pressure drop.

A more detailed object of the invention is to provide a sintered metal filter of a unitary and simplified construction which increases its durability.

A further object of the invention is to provide a sintered metal filter for which the tooling expense is negligible, and which accordingly can be made in a wide variety of sizes and capacities at a minimum additional expense to the manufacturer and consumer.

Still another object of the invention is to provide a sintered metal sump type filter which permits flushing or cleaning by means of a back wash.

The foregoing objects and advantages are achieved through the construction of a unitary filter having a cap, a tubular screen body, and a base. The base may be formed either of screen or of a material similar to the cap. The cap is provided with a coupler or similar outlet tube to carry off the fluid which has been filtered by the body portion of the filter unit. Surrounding the tubular screen body portion is a layer of sintered metal. The sintered metal is made up of pellets or particles, the diameter of which is slightly larger than the dimensions of the openings in the screen, thereby permitting the two-fold use of the screen as a mold in forming as well as a structural member in the finished construction. When the sintered metal, by means of a co-axial mold, is fused in place around the body screen, it serves to unitize the body elements, braze itself to the screen body portion, and provide a superior filtering medium on a most economical basis.

The foregoing principles as well as the objects and advantages will be more fully appreciated as the following description of an illustrative embodiment of the invention proceeds taken in conjunction with the accompanying drawings in which:

Figure 1 is a diagrammatic view of a sintered metal filter illustrative of the invention showing a typical usage.

Fig. 2 is a perspective bottom view of the sintered metal filter illustrated in Fig. 1.

Fig. 3 is a partially exploded perspective view of the filter unit shown in Fig. 2.

Fig. 4 is a transverse sectional view of the filter shown in Fig. 2 taken along section line 4—4 of Fig. 2.

Fig. 5 is an enlarged partially broken transverse section of the sintered metal and screen relationship taken along section 5—5 of Fig. 4.

Fig. 6 is a front elevation, partially exploded, and in partial section, illustrating the relationship between the component parts of the filter unit and a jig or mold employed in its assembly.

Fig. 7 is a partial sectional view of the mold and filter components in their assembled relationship as contemplated by Fig. 6.

Fig. 8 is a subsequent showing of the mold and component parts as illustrated in Fig. 7 illustrating how the sintered metal is added to the mold.

Fig. 9 is a front elevation in reduced scale of the screen portion from which the filter body is formed.

Fig. 10 is a partially exploded perspective view of the screen body formed into tubular section and its associated base.

Fig. 11 is a front view of the screen body illustrating how the scalloped edge is formed into a relatively annular opening at the top of the screen body.

As pointed out above, the filter unit or cartridge 10 contemplated by the present invention finds its principal use in a sump 11 such as illustrated in Fig. 1. The outlet coupler 12 of the filter unit 10 is threaded or otherwise conveniently secured to an outlet pipe 14 through which the fluid 15 in tank 16 is emptied. The direction of flow into the filter cartridge 10 is diagrammatically indicated in Fig. 1. It should be appreciated, however, that in certain applications this flow may be reversed, and indeed, in the cleaning of the cartridge 10 by back washing such a reversible flow would be normally contemplated.

Referring now to Fig. 2, it will be seen that the filter cartridge 10 presents a generally cylindrical overall configuration with a coupler 12 extending from one end, designated as the top in this particular description. The top of the filter cartridge 10 is in the form of a cap 18 having a peripheral rim or skirt 19 and an annular top portion 20 (as shown in Fig. 3). The exterior of the cylindrical body portion 21 appears as though the entire cylinder were formed of a uniform mass of sintered material, including the bottom 22. Actually, the coating of sintered metal is relatively thin, and varied by the manufacturer for the different sizes of units in such a manner as to provide sufficient rigidity and flexibility. An oversupply of sintered material will make the filter 10 unduly heavy, expensive, and introduce an uneconomic pressure drop. On the other hand, if the layer of sintered metal is too thin the body will become delicate, fragile, and will not have the life expectancy desired.

Normally the sintered metal should be put on in a thickness to equal between three and five layers of the sintered metal particles. The particle size diameter, in turn, should be approximately 1⅓ times the largest dimension of the individual openings in the screen body. Stated another way, the dimensions of the screen mesh openings should be about three-fourths that of the diameter of the sintered metal particle. The foregoing spatial relationships produce excellent results, although they do not necessarily constitute an essential of the invention. It is important, however, to the method involved, for the particle size to exceed that of the screen body portion.

The unique method for manufacture, as well as a full appreciation of the filter unit itself, proceeds with a detailed understanding of the elements of the filter unit. Referring now to Fig. 3, it will be seen that the cap 20 has a peripheral skirt 19 which is proportioned to overlie the screen body portion 24. The scalloped end of the screen body 24 (such end to be described in detail later)

is folded over, normally on a mandrel, in order to present an annular screen end 25 to the body 24. The sintered metal exterior cylinder 26 abuts the edge of cap skirt 19 and secures the configuration of the screen body 24 which, in the present instance, has been shown as a cylinder. It will be appreciated, of course, that the cylindrical configuration could be varied to an elliptical form or a square form, or a wide variety of variations depending upon the space requirements involved. If, for example, the sump 11 was extremely narrow and yet required a high gallonage filter, an elongated race track type cross section might be the solution. With the construction contemplated by the invention a maximum of shapes is available.

The screen body 24, and its formation, is best illustrated in Figs. 9, 10, and 11. In Fig. 9 it will be seen that the body 24 is formed from a rectangular piece of screen with one end presenting a plurality of scallops 25 appearing somewhat like a parapet type wall. The body 24 is then rolled on a mandrel (not shown) to conform to the shape thereof and then spot welded or otherwise secured along a longitudinal overlapping seam 28. A screen base 29 having a peripheral rim 30 is formed by a punching operation, and proportioned to nestingly overlap the body 24 as illustrated at the upper portion of Fig. 6. The scallops 25 at the end of the screen body 24 are bent centrally and overlappingly to form the annular body opening 23 as illustrated in Fig. 11 and Fig. 3. In this manner it serves as a mounting base for the cap 18 and insures a complete filtering of fluid passing through the sintered shell 26.

Before reviewing the unique method for manufacturing the filter cartridge 10, the theory of fluid flow will be described with particular reference to the diagrammatic illustration of Fig. 5. In Fig. 5 the sintered metal particles 31 are shown as perfect spheres. In actual practice this will not be the case. The particles will, however, approximate spheres at least in their function of passing fluid therebetween and their behavior in the sintering process. The sintered material is formed by techniques well known in the art and of materials suitable for the operation. Normally a bronze is employed. The sintered spheres 31 are sized to make sure their diameter exceeds the distance D between the edges of the screen body portions. Although during the heating process the spheres 31 will weld themselves to each other at their points of contact, the interstices between the points of contact will permit the passage of fluid as diagrammed in Fig. 5. Although the path is a circuitous one, it is over spherical surfaces rather than irregular surfaces. In actual testing it has been found that the pressure drop through sintered metal in combination with a screen body such as shown is substantially less than that involved in multiple screen, wire mesh, felt, and other well known filter media. Irrespective of the theories discussed, the invention proceeds independently and is predicated upon the results achieved.

The unique body construction of the filter not only achieves superior operating characteristics, but permits manufacturing techniques hitherto unknown in the filter field. One such unique method for manufacturing is illustrated in Figs. 6 through 8. In this method a jig 32 having a tumbler like body portion 34 and partially hollowed cylindrical base stem 35 with a support 36 is employed. The coupler 12 is first dropped into the recess 38 in the base cylinder 35. The base cylinder recess 38 is of a depth slightly greater than the length of the coupler 12. This permits the deposition of an annular film of brazing powder 39 (see Fig. 7) on one end of the coupler 12 before the cap 18 is placed at the top of the coupler 12. Thereafter the screen body 24 is dropped nestingly into the cap 18 where it is overlapped by the rim 19 of the cap 18. The base 20 of the cap then abuts the annular open end 23 of the screen body 24, but not until a layer of brazing powder 40 is sprinkled inside the cap 20 to abut the annular opening 23.

The screen base 29 is then inserted over the open end of the cylindrical body 24.

As illustrated in Fig. 8 after the elements have been assembled as shown in Fig. 7, the sintered metal particles 31 are sprinkled into the jig 32 to permit a multi-layer thickness of sintered metal powder to build up peripherally around the screen body 24 as illustrated. After the sintered metal has surrounded the body 24 and covers the bottom of the base 29, the jig 32 is run through a sintering furnace (not shown). The temperature to which the furnace is heated and the time allowed for the jig to pass through the furnace is determined by the size of the filter unit and the size of the sintered metal particles 31 as well as their composition. The time and temperature should both be proportioned, however, to effectuate a sintering of the particles 31 and their brazed relationship to the screen body 24. Also the temperature and time should permit the brazing of the annular open end 23 of the screen body 24 to the cap top 20; and the coupler 12 to the cap top 20 through the brazing powder layers 39, 40. Thus the unitary relationship of all of the parts is achieved by a single firing ooperation, which at the same time forms the principal filtering element, the sintered metal outer coating of the screen body.

In review it will be seen that a new and unique type of filter unit has been disclosed which is extremely simple in its construction, and admits of a most economical and simple manufacturing method. Filter units may be manufactured at a cost which might even eliminate their cleaning, it being more economical to replace the filter with a new unit. Even if the filters are to be cleaned by the user the cost of replacement inventory will be sufficiently low to permit an economical cleaning program.

Although particular embodiments of the invention have been shown and described in full here, there is no intention to thereby limit the invention to the details of such embodiments. On the contrary, the intention is to cover all modifications, alternative embodiments, usages and equivalents of the filter unit as fall within the spirit and scope of the invention, specification, and appended claims.

I claim as my invention:

1. In a unit for filtering particulate matter from a fluid flowing therethrough, a hollow filter body comprising a screen equipped with a screen closure at one end thereof, a cap substantially closing the other end of said screen body and defining connecting means for communicating the interior of said filter body with a fluid flow line, and a mass of pellets defining a substantially continuous coating along the outer surface of the screen end closure and screen body and being bonded to each other and to the screen body and end closure to form an integrated structure therewith, whereby both said screen body and screen end closure define filtering areas through which fluid may pass to the interior of the screen body.

2. The structure of claim 1 in which said screen end closure comprises a generally planar screen section equipped with a laterally turned perimetric flange that telescopically engages the associated end of said screen body, said screen end closure being secured to said screen body at least in part by the interconnecting bond between said pellets and the screen body and screen end closure.

3. The structure of claim 1 in which said filter body at the end thereof adjacent said cap is equipped with an inwardly extending flange, and in which a layer of pellets is interposed between said inwardly turned flange and said cap and is bonded to each and to each other to secure the cap to the screen body.

4. In a unit for filtering particulate matter from a fluid flowing therethrough, a hollow screen body, a screen cap equipped with a laterally turned perimetric flange telescopically engaging one end of said screen body and effectively forming a continuation thereof, the other end of said screen body being equipped with an inwardly extending screen portion, a metal end cap equipped with a laterally turned perimetric flange telescopically receiving the last mentioned end portion of said screen body therein and being adapted to be connected to a fluid flow line, a mass of sintered metal pellets substantially enclosing said screen body and screen cap and being bonded to each other and to the screen body and end cap whereby both the body and screen end cap form filtering areas through which fluid may flow to the interior of the screen body, and a layer of sintered metal pellets disposed between said metal end cap and said inwardly extending screen portion, the pellets defining such layer being bonded to each other and to said metal cap and inwardly turned screen portion to secure the metal cap to said screen body.

5. The apparatus of claim 4 in which said inwardly extending screen portion comprises a plurality of separated screen body segments turned inwardly to lie along a plane generally normal to the longitudinal axis of said screen body.

6. The structure of claim 4 in which substantially all of said pellets contiguous with said screen body and screen cap have at least one dimension that exceeds the size of the screen openings by about one-third.

7. In a method of making a unit for use in filtering particulate matter from a fluid flowing therethrough, the steps of forming a hollow screen body and equipping the same with a screen end cap, confining a mass of sintered metal pellets in contiguous relation with the outer surfaces of said body and end cap, elevating the temperature of the pellets during such confinement thereof to effectuate a bond between the pellets and also between the pellets and screen body and end cap, whereby said screen body and end cap and the sintered metal pellets thereabout define an uninterrupted filtering area through which fluid may flow to the interior of said screen body.

8. In a method of making a sintered metal filter, the steps of forming a screen into a hollow body, folding over an end portion of said body to define a plane substantially normal to the longitudinal axis of said hollow body, equipping the other end of said body with a screen cap, closing the folded end portion of said screen body with a metal cap and depositing a layer of sintered metal pellets between such metal cap and folded end portion, confining a mass of sintered metal pellets about said screen body and screen cap, and elevating the temperature of the entire unit to bond said pellets to each other, to said screen body and screen cap, and to said metal cap and folded end portion of the screen body, whereby a unitary structure is formed with the screen body and screen end cap defining uninterrupted filtering areas through which fluid may flow into the interior of said screen body.

References Cited in the file of this patent

UNITED STATES PATENTS 519,664 Chamberland ------------ May 8, 1894
949,357 Hebbeler --------------- Feb. 15, 1910
2,327,687 Williams et al. ---------- Aug. 24, 1943
2,454,982 Wallace ---------------- Nov. 30, 1948
2,457,051 LeClair ---------------- Dec. 21, 1948
2,536,274 Gaugler ---------------- Jan. 2, 1951